May 8, 1962 J. C. WARD 3,033,591
VEHICLE SUSPENSION SYSTEM OF THE DEFORMABLE CUSHION TYPE
Filed May 23, 1958 5 Sheets-Sheet 1
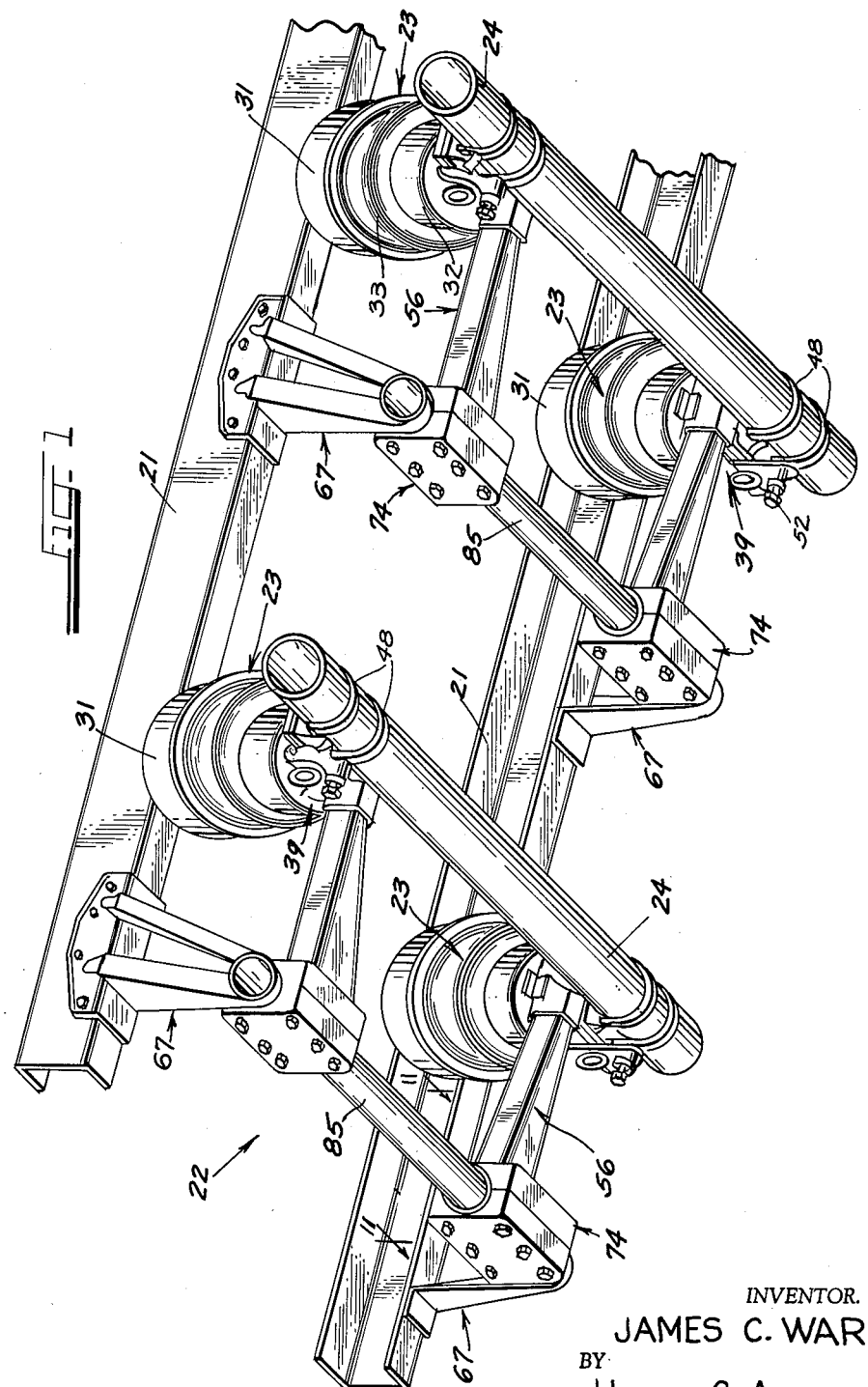
INVENTOR.
JAMES C. WARD
BY HARRY C. ALBERTS May 8, 1962    J. C. WARD    3,033,591
VEHICLE SUSPENSION SYSTEM OF THE DEFORMABLE CUSHION TYPE
Filed May 23, 1958    5 Sheets-Sheet 2
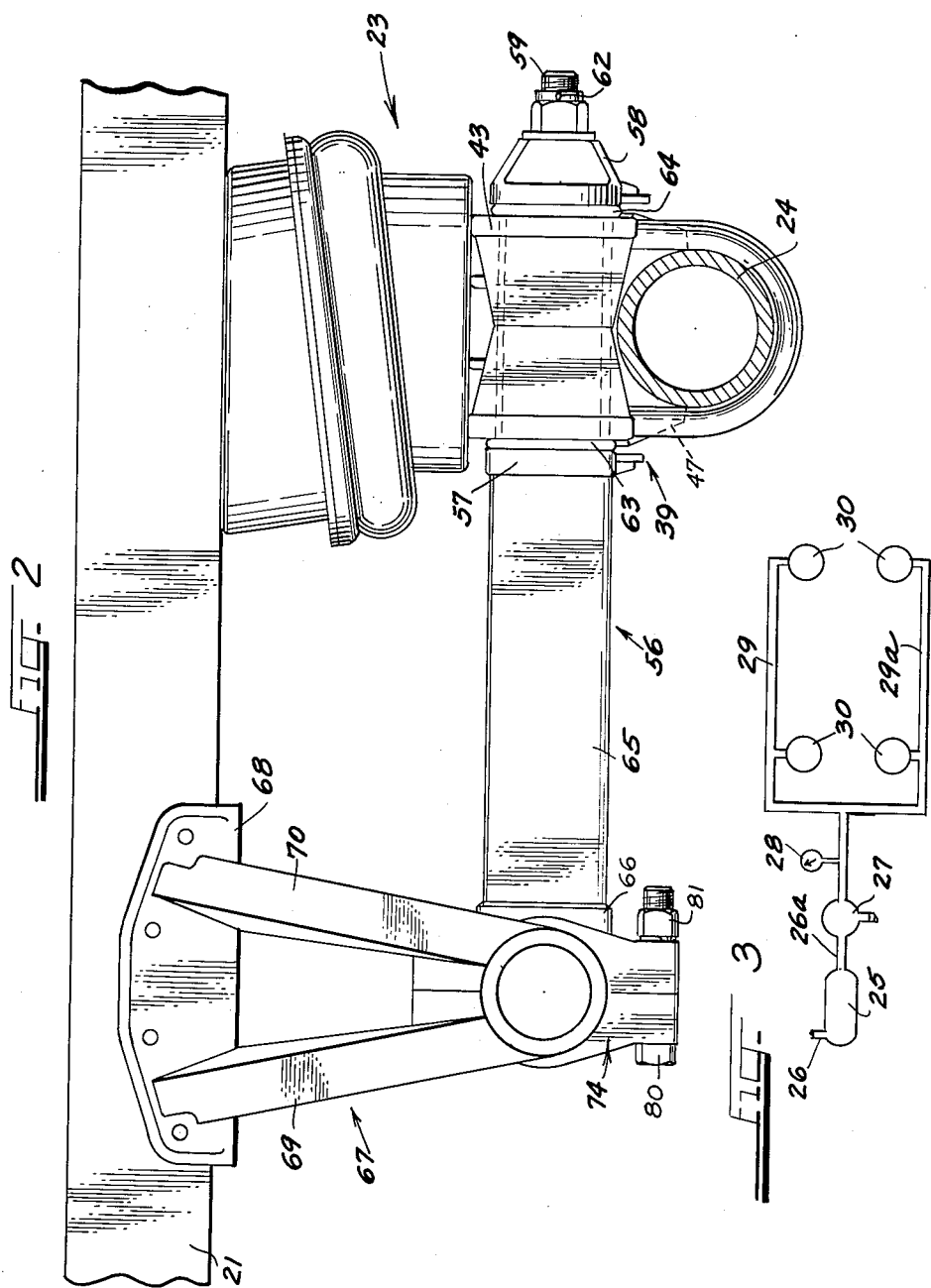
INVENTOR.
JAMES C. WARD
BY
HARRY C. ALBERTS

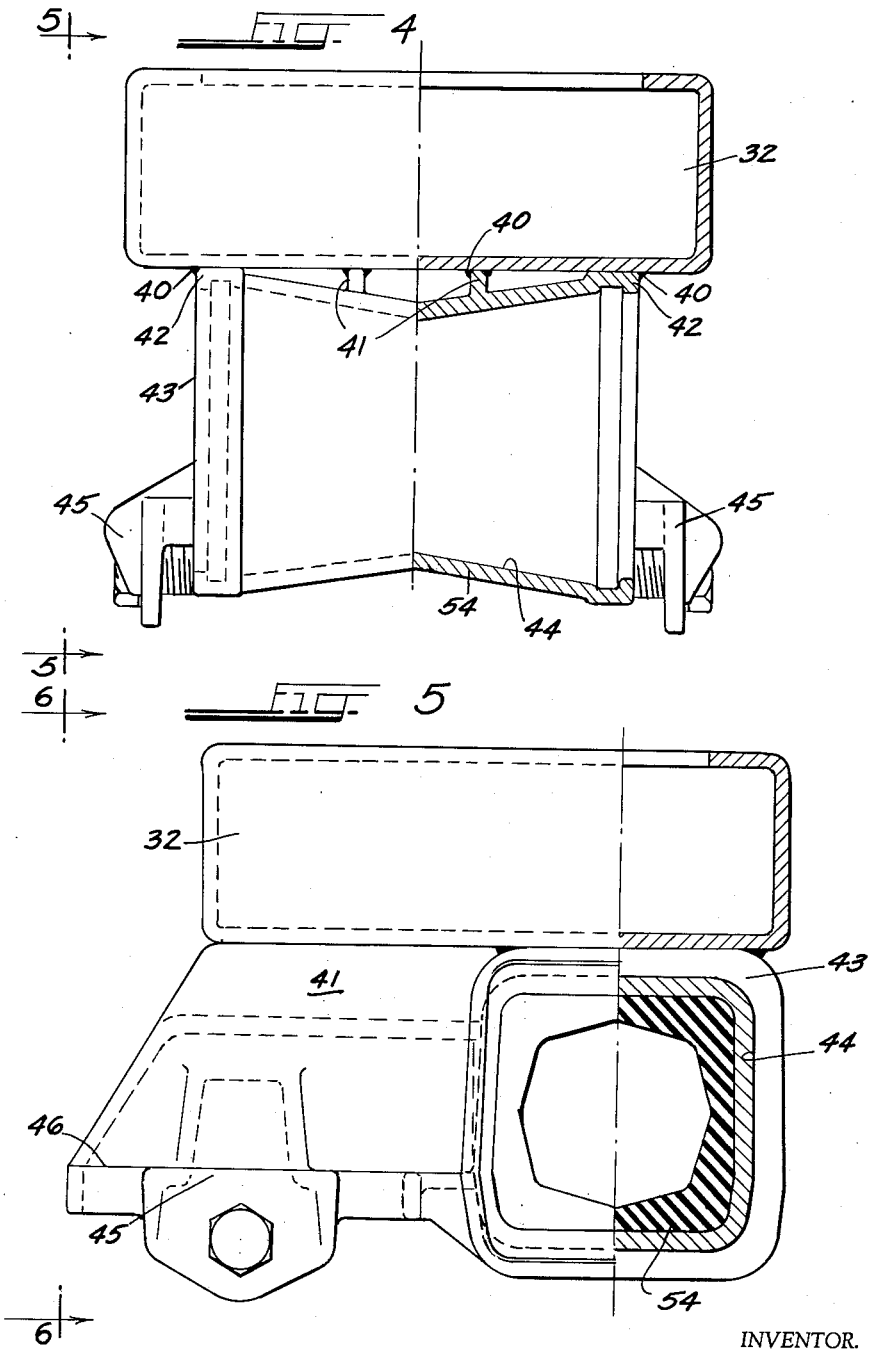

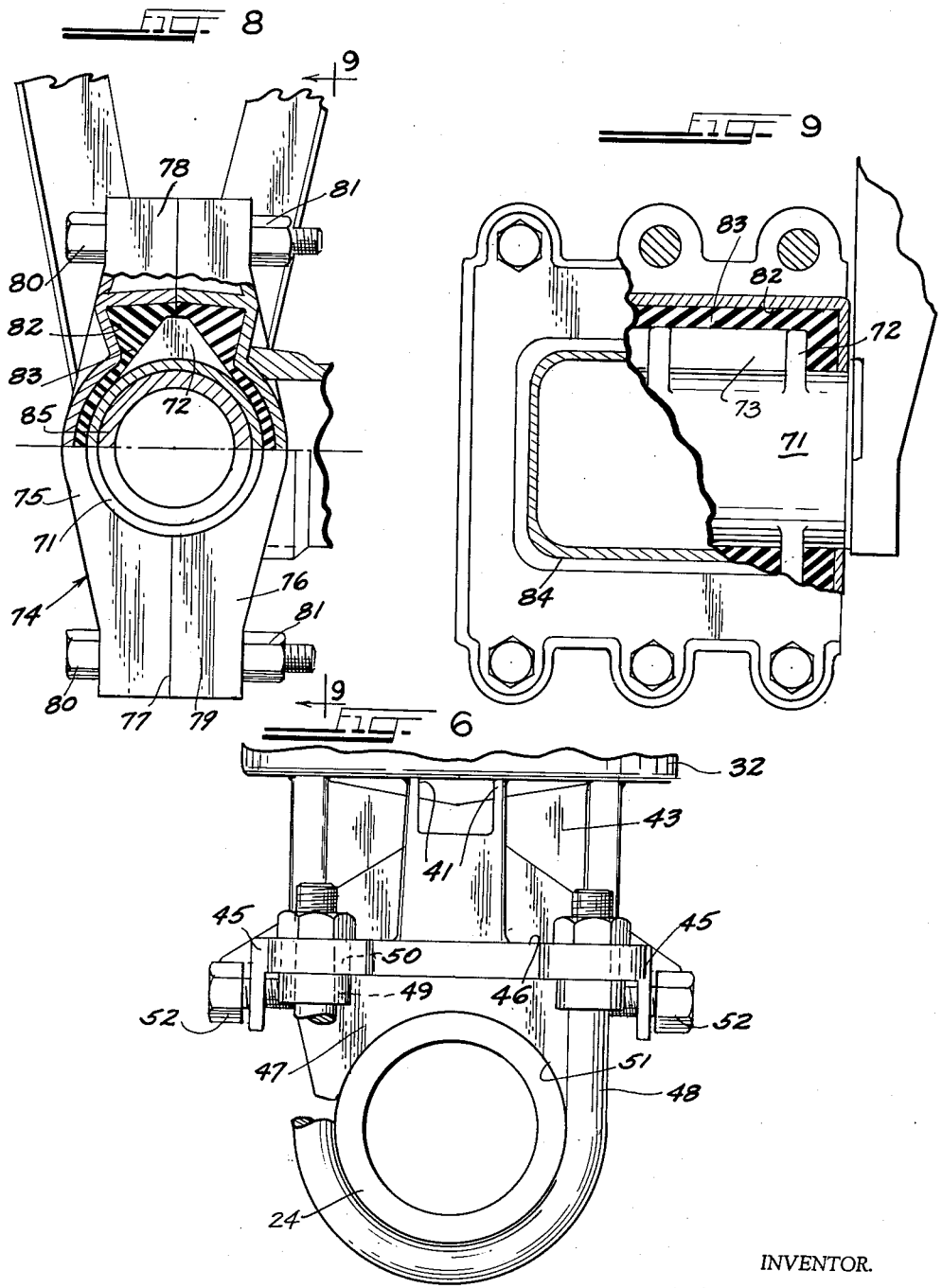

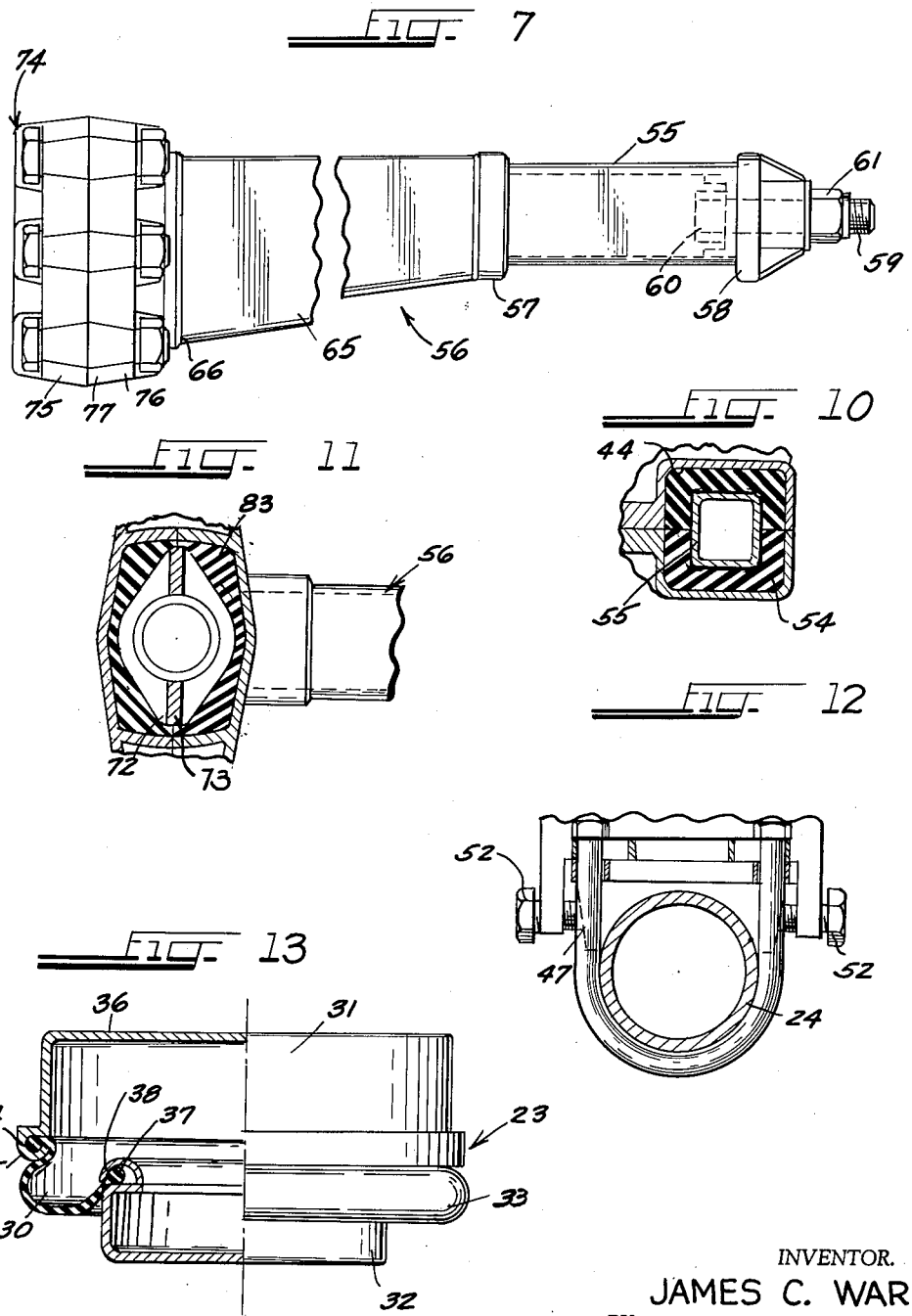

United States Patent Office 3,033,591
Patented May 8, 1962

3,033,591
VEHICLE SUSPENSION SYSTEM OF THE DEFORMABLE CUSHION TYPE
James C. Ward, Springfield, Mo., assignor to Webb City Metal Products, Tulsa, Okla., a corporation of Missouri
Filed May 23, 1958, Ser. No. 737,260
6 Claims. (Cl. 280—124)

This invention relates to vehicle suspension systems; to suspension systems of the type having pneumatic bellows or cushions, commonly referred to as "air springs," interposed between the vehicle chassis frame and axle unit; and, more particularly, to an improved air spring suspension system and structure adapted to minimize side sway, roll, brake hop or wheel chatter, and other undesirable forces coming into play as the vehicle rounds curves and otherwise traverses terrain.

The present invention is adaptable to the suspensions of trailers, semi-trailers and trucks; and further may be applied to single or tandem axle arrangements, and in the case of the latter the same may be of the type wherein both, only one, nor neither of the axles is a drive axle.

In the recent past, the use of air springs for mounting vehicle frames upon axle units has become increasingly more widespread, especially in the case of trucks, trailers and semi-trailers. Such springs generally comprise resilient materials, like reinforced rubber, shaped as bellows; and are mounted at their lower ends to the vehicle axle units while carrying at their upper ends plates or cylinder-like structures upon which rest the vehicle frames. One of the principal reasons for the popularity of air springs is the rather low load/deflection ratio, or "rate," they afford. That is, they permit a high deflection so that impact shock to the vehicle is less. This high deflection, or long spring stroke, is achieved regardless of load, since adjustment for variations in load are accomplished readily by varying the pressure in the air springs. In contrast, the usual steel springs, when carrying light loads, experience extreme and severe vibrations, since such stiff springs are not deflected appreciably and have little resilience without a load thereon. With air springs, a soft and smooth vehicle ride always is achieved; since air, when it is at the proper pressure, is an efficient resilient medium capable of receiving and storing energy over long periods of time. Modern air suspension systems further afford convenient means for compliance with State laws requiring equalization of loads on axles of tandem suspensions, and also provide means for achieving constant frame height from the vehicle wheels.

Air springs, however, primarily are intended for use to resist only vertical loads and forces. Because they permit high deflection, air springs have low resistance to lateral forces; further, they are susceptible to harmonic motions (like a bouncing ball) of the suspended vehicle body arising, for example, from braking forces imparting unbalanced loads thereto. Brake, and also draft, torques also cause one side of an air spring to compress while its other stretches, the resulting air spring deformation causing undue wear. The undesirable lateral forces generally arise from axle misalignment with the longitudinal median of the vehicle frame or when the vehicle rounds curves. During the latter, the vehicle frame and load tend to move transverse to the air springs, imposing severe shear or tearing forces thereon.

Resistance to these undesirable forces, of course, must be provided if the use of air springs is to prove feasible. Not only the wear of the springs is involved, but the safety of the vehicle, its load and driver must also be taken into consideration. For example, as the vehicle rounds a curve, its body and load tend to travel off in a tangent path. Structure thus must be provided to resist this tendency. In the case of the usual steel elliptical or leaf springs, they have their own controls built therein. As demonstrated in the foregoing, however, air springs offer little resistance to transverse or lateral forces, and these problems are particularly peculiar to them. Attempts have been made to use with air suspension systems limit means in the form of stops, tension bars and blocks to resist the lateral forces created from roll and side sway. The high impacts which these limits actually create, however, defeat the very reasons giving rise to air springs; since such limits themselves act as high rate springs. Other systems using "walking beams" and the like are complicated, expensive, and offer only partial solutions to the problems inherent in air suspension systems.

Accordingly, a primary object of the present invention is to provide an improved suspension for vehicles, which suspension overcomes the foregoing and other shortcomings found in prior art vehicle suspension systems.

The present invention thus involves a vehicle suspension system which comprises, in its most comprehensive form, air springs interposed between the vehicle frame and axle unit. Means supplementary to the air springs are provided to transfer draft and brake torques, horizontal loads and other lateral forces to the vehicle frame, leaving the air springs substantially free of all but vertical loads and forces.

With vehicles having multiple axle units, that is where the axles are arranged in tandem, the problems arising from these adverse loads and forces become even more acute and complicated; and, consequently, it is an object of this invention to provide, in combination with a tandem axle unit having air springs interposed between it and the vehicle frame, improved means connected with the axles and associated with the vehicle frame to maintain the axles and air springs free from the aforesaid adverse loads and forces.

In axle units of the type herein disclosed air springs are provided at each side of the axles, and it is a further feature and object of this invention to provide the supplementary means in the form of novel arms arranged one at each side of an axle, and adapted to transmit to the vehicle frame substantially all of the braking and draft torques, and horizontal and lateral forces which come into play.

A still further object of the present invention is the provision of means in association with one end of each arm and the axle with which it is connected whereby forces arising from canting of the axle during vehicle negotiation of curves or cornering are transmitted to the vehicle frame. In carrying this object out, the connection between the arm and its axle is of a jointed nature employing resilient means adapted to resist relative motion between the arm and its axle at their point of connection.

And, still another object of this invention is to provide further means in association with the vehicle frame and each arm whereby control is maintained over the vertical displacement of the axle to which the arm is connected, thereby eliminating the harmonic motions which often arise. Within the ambit of this object, the invention contemplates the provision of a unique pivotal connection between the vehicle frame and each arm, including further a resilient bushing adapted to resist pivoting of the arm about the bushing.

Stated somewhat differently, the present invention contemplates among its objects the provision for each axle, at each end thereof, of a novel arm connected at one end to said axle and at its other end to the vehicle frame, the arm at said other end being adapted to resistively permit swinging of the axle with respect to the vehicle frame about a horizontal axis and over a short arcuate path, the arm at said one end being adapted to allow limited canting of the axle as the opposite ends of the axle move vertically relative to one another, as when the vehicle travels over rough terrain.

Another object of the present invention is to provide means whereby during braking of the vehicle greater roadability is imparted thereto by converting the usual braking torques which arise into vertical or load components which increase vehicle stability and traction.

The invention contemplates among its specific objects the provision of a suspension system which with comparative ease may be mounted to either new or existing vehicles; which includes means whereby axle alignment or adjustment may be accomplished with no difficulty; and which is of a highly simplified construction, and in particular facilitates mounting of the air springs directly over the wheel axles rather than requiring mounting of the springs off-set from the axle and employing attendant connecting beams, tie rods and the like.

Still another specific object of this invention is to provide novel bushing constructions at either end of the axle arms, which constructions are capable of withstanding and absorbing the forces transmitted thereto so that the air springs experience substantially only vertical loads and forces. The bushing constructions further alleviate the usual problems attendant with maintenance, repair and replacement by providing easy access to within the connections at either end of the axle arms.

The foregoing objects are made possible in accordance with the present invention by the provision of an air spring suspension in underlying relation to a vehicle frame structure and supported upon a vehicle axle unit, which, as exemplified herein, includes tandem axles. As further exemplified herein the air spring suspension includes separate air springs arranged at each end of each axle; although, of course, the invention may be applied to instances where a single elongated bellows or air spring is positioned to span between like ends of the axles. To transmit adverse horizontal forces directly to the vehicle frame rather than to the air springs, each axle at its respective ends and adjacent to the air springs has attached thereto torque arms which preferably extend forward, or in the direction of vehicle travel.

Each arm at its forward end is connected with a rigid bracket connected to the vehicle frame. The latter connection is in the form of a pivoted connection including a resilient bearing or cushion which resistively or yieldingly permits slight pivoting of the arm about a horizontal axis. At the connection of each arm with its axle there is provided a joint structure also including resilient material which allows limited twisting of the axle relative to the arm. Vertical displacement of the axle, as well as the forces created by draft and braking torques, together with the tendency to harmonic motions of the suspended vehicle body, is controlled by the arrangement between the axle arms and the vehicle frame. Similarly, horizontal and lateral forces, such as those created when rounding curves, and during canting of the axles, are controlled by the joint arrangement between the axle arms and the axles.

More specifically, when an axle tends to move vertically along an arcuate path, this movement relative to the vehicle frame is resisted or damped by the resilient properties of the pivoted connection between the brackets and the forward ends of the arms, there being provided thereat rigid chamber formations wherein the compressible resilient material is retained to damp the vehicle oscillations. Forces not completely damped are transmitted to the vehicle frame. When the vehicle negotiates a bump it causes vertical displacement of the axle and the forces creating such displacement are stored up in the air springs and transferred to the vehicle body at a much lower velocity, thus substantially damping and reducing the impact of the forces. However, such forces result in the body rising vertically relative to the ground and subsequent falling of the body results in the body travelling to below its normal static position. This motion would continue until less additional resistance to such travel is afforded. The resilient connections at the forward ends of the arms offer frictional resistance to and damp such oscillations and movements as well as control of such movement, both above and below the static position of the vehicle body, thus causing it to return to its desired static position much sooner.

The foregoing objects, features and advantages of construction will become more apparent upon a consideration of the following description together with the accompanying drawings.

In the drawings:

FIGURE 1 is a perspective view looking up at axle unit and suspension embodying the present invention;

FIGURE 2 is a fragmentary side elevation view showing a typical suspension at one end of an axle;

FIGURE 3 is a schematic representation of an air pressure system employable with the air springs of the present invention;

FIGURE 4 is a side elevation view of a pedestal assembly for supporting an air spring, with the torque arm removed;

FIGURE 5 is a front view of the same, partly in cross-section, and taken on line 5—5 in FIGURE 4;

FIGURE 6 is also a side elevation view, opposed to that shown in FIGURE 4, and is taken on line 6—6 in FIGURE 5;

FIGURE 7 is a plan view of a torque arm employed in the present invention;

FIGURE 8 is a side elevation view, partly in section, disclosing means for resiliently supporting the forward end of a torque arm;

FIGURE 9 is a cross-sectional view taken on line 9—9 in FIGURE 8;

FIGURE 10 is a cross-sectional view showing the resilient joint between a torque arm rear end and the pedestal assembly to which it is joined;

FIGURE 11 is a cross-sectional view taken on line 11—11 in FIGURE 1 and showing in detail the resilient mounting of a torque arm at its forward end;

FIGURE 12 is a detailed elevation view looking into an axle and showing means for adjusting alignment of the same; and FIGURE 13 is an elevation view partly in cross-section disclosing the construction of an air spring employed with the present invention.

The structure selected for illustration is not intended to serve as a limitation upon the scope or teachings of the invention, but is merely illustrative thereof. There may be considerable variations and adaptations of all or part of the teachings depending upon the dictates of commercial practice.

Referring to the drawings, the present embodiment comprises, along with the longitudinal members 21—21 of the vehicle chassis frame, an axle unit 22 including springs which as illustrated herein include air spring assemblies 23 arranged one adjacent each end of each wheel axle 24, there being a tandem or dual axle arrangement illustrated in FIGURE 1. The axle unit 22 is arranged in underlying relation to the frame members 21 and each air spring assembly 23 is interposed between a frame member 21 and the end of an axle 24 proximate thereto, thereby providing resilient or air cushion connections between the chassis frame and each axle end. Each air spring assembly 23, as seen in FIGURE 3, is connected to a suitable pressure tank 25 connected to the air compressor (not shown) of the brake system by means of a conduit 26. Air is distributed from the pressure tank 25 to the separate sides of the suspension by means of a conduit 26a wherein there are provided a valve 27 and gauge 28. The conduit 26a branches into two lines 29a, 29, leading to the two air springs at each side of the suspension. By using valve 27, variations in the vehicle load may be compensated for by adjustment of air pressure to the air springs. The air pressure at either side of the suspension further is controlled by a suitable levelling valve system, as will be understood by those skilled in the art.

Each air spring assembly 23 generally includes, as best seen in FIGURE 13, a bellows or air spring 30, an air spring cylinder 31, and an air spring piston-like member 32. Each spring 30, as illustrated herein, is cylindrically shaped, is formed from a single convolution 33 of resilient material such as reinforced rubber, and when normally inflated is several times greater in diameter than height. The rather large cross-sectional area of the spring 30, of course, permits the use of relatively low pressures therein. At its upper rim 34 the spring 30 is connected in a bead ring 35 of the air spring cylinder 31, the upper plate surface 36 of which provides support for suitable mounting of a frame member 21 thereto. At its lower rim 37, the spring 30 is secured in a bead ring 38 of the air spring piston 32.

Mounting of an air spring assembly 23 to an axle 24 is accomplished by means of spring pedestal assemblies 39, there being one for each air spring assembly 23 or one at each end of an axle 24. The pedestal assemblies 39 at either end of an axle 24 are complementary or mirror images of each other. Consequently, for the purpose of exposition, only one such assembly 39 will be described in detail, it being understood that its paired pedestal assembly 39 at the opposed end of the axle 24 is similarly constructed.

As seen best in FIGURES 4 to 6, each air spring piston 32 is mounted to its respective assembly 39 by suitable means, such as weldings 40, which secure the piston 32 atop longitudinal pedestal ribs 41, 41, and the end flanges 42, 42, of a rigid housing 43. Within the housing 43 there is provided a torque arm cavity 44, described in greater detail hereinafter. The ribs 41 are integral with and extend laterally from housing 43 to provide support for integral depending bracket structures 45, 45, and a horizontally extending shelf 46.

The brackets 45 and shelf 46 provide means for supporting an underlying wheel axle seat 47. Each axle seat 47 is adapted to be maintained between the brackets 45, 45, beneath shelf 46, and supported therefrom by means of U-bolts 48 the ends of which extend through suitable openings 49 in the seat 47 and through slots 50 in the pedestal shelf 46. The slots 50 are elongated in a direction generally perpendicular to the axis of the axle 24. Each axle seat 47 is provided with a downwardly facing generally semi-circular surface 51 to which the axle 24 may be welded, and which, together with the U-bolts 48, provides a suitable support for the axle 24.

Means further are provided for adjusting axle alignment in a generally horizontal plane and transverse to the axle axis. This means is exemplified in FIGURE 12 by the provision of oppositely facing cooperable bolts 52, 52, threadable through brackets 45, 45 and arranged to bear against opposed sides of the axle seat structure 47. By variably adjusting the bolts 52, 52, the position of the axle ends may be correspondingly changed. During axle alignment, of course, the U-bolts 48 are loosened in order that they may be moved in their longitudinal slots 50. Lock nuts are provided to maintain the desired axle alignment.

Referring to FIGURES 5 and 7, within each cavity 44 a resilient bushing 54 is provided to surround the rearward end structure 55 of a torque arm 56, the end structure 55 being generally square in cross-section. Each torque arm end structure 55 includes oppositely facing plates 57, 58, the former of which is fixed to the torque arm 56 while the latter is in the form of a compression clamp axially movable along a bolt 59, the head 60 of which is set within the end structure 55 while the remainder extends outwardly therefrom to receive compression clamp plate 58 and a threadable nut 61 adapted to move plate 58 towards 57 and thereby put the bushing material under compression. A cotter pin 62 further is provided to prevent accidental removal of nut 61. That portion of the bushing 54 which extends outside of cavity 44 to the front and rear thereof is indicated respectively at 63 and 64 in FIGURE 2.

Each torque arm 56 extends outwardly from its cavity 44 in a direction generally parallel with the frame members 21, and forwardly or in the direction of vehicle travel. The middle structure 65 of each torque arm 56 is rigid with the end structure 55 thereof and in elevation appears generally rectangular in shape, as best seen in FIGURE 2, but in plan grows gradually in breadth, as best seen in FIGURE 7.

To support each torque arm 56 at its forward end 66, a depending bracket 67 is provided. Each bracket 67 includes mounting structure 68 secured to a frame member 21, and struts 69, 70, which extend downwardly and convergingly to integrally carry a substantially cylindrical structure 71 provided with fins 72, 72, interconnected by radially extending webs 73, 73.

A bearing housing 74 is provided to receive the forward end 66 of the torque arm 56 and further to maintain therein the cylindrical structure 71. Referring to FIGURE 8 the housing 74 comprises forward and rear half members 75, 76 respectively, which meet at a line of junction 77 and include at their respective upper and lower portions matching flanges 78, 79, secured together by suitable fasteners such as bolts 80 and nuts 81. Within the cavity 82 provided by the halves 75, 76, a resilient bushing 83 is provided about the cavity walls and arranged so as to surround the cylindrical structure 71 together with its fins 72 and webs 73. The housing rear half 76 further has a generally rectangular shaped opening 84 adapted to receive the torque arm forward end 66 which is complemental thereto and connected therewith. In effect, therefore, the housing 74 is an integral part of the torque arm forward end 66 and is trunnioned or pivoted to a resilient bearing provided by the cylindrical structure 71 and bushing material 83 which surrounds the same.

To provide greater rigidity to the brackets 67 which support the same axle, a reinforcing rod 85 extends between the laterally spaced brackets and within the cylindrical structures 71.

As is apparent, each torque arm 56 thus is arranged for pivoting about a horizontal axis provided by the cylindrical structure 71 fixed to a bracket 67. Such pivoting, however, is resisted by the bushing 83 against which the fins 72 and webs 73 bear as the housing 74 pivots with the torque arm 56. As the amplitude of torque arm pivot increases, the resistivity of the bushing 83 correspondingly increases thereby damping the effects of vertical movement of the related axle 24.

Each torque arm 56 further is arranged to permit relative twist between itself and the axle 24 from which it extends, there being provided therebetween a resilient joint which includes within cavity 44 the bushing 54 surrounding the torque arm rearward end structure 55. As the axle 24 cants, or its respective ends move vertically with respect to each other, a twisting force is imparted to the torque arm 56. This twist is yieldingly resisted by the bushing 54, thereby damping the effects of axle canting, or other lateral forces which come into play.

The herein suspension further has particular utility and effect in stabilizing the vehicle and preventing harmonic motions and chatter, as when brakes suddenly are applied to the vehicle when it is travelling at high speeds. Referring to FIGURE 2, as the vehicle is travelling forward, or to the left as illustrated therein, the application of the brakes to slow the vehicle down or bring it to a halt, creates a torque in the axle 24 which supports the brake assembly. This torque, with reference to the same FIGURE 2, tends to rotate the axle 24 counterclockwise. A small part of this torque may be resisted by the resilient bushing 54; however, the far greater part of the torque, or substantially the whole of it, is transmitted to the torque arm 56. As the torque is transmitted to the torque arm 56 the latter is restrained from turning by the resilient trunnion mounting at its forward end which thereupon exerts or imparts a downward force or thrust on the vehicle frame. In turn, the downward thrust creates an added load on the air springs 30 which compress to lower the vehicle body and increasing vehicle roadability and stability during brake application. The added downward thrust also increases traction to facilitate stopping.

It will be apparent from the foregoing that at the jointed connection between each arm 56 and axle 24 there are provided a rigid housing 43 having a rigid part 55 disposed therein but spaced apart from the housing inner wall by a resilient bushing 54, and that the rigid part 55 is so arranged that, with the bushing 54, it is capable of yieldingly resisting relative twist between itself and the housing 43. In the herein illustrated and described embodiment of the invention, the rigid part 55 is provided integral with the arm 56 while the housing 43 is arranged for fixed attachment with the axle 24, and pivoting about an axis generally parallel with arm 56. It further will be apparent that at the jointed connection between each arm 56 and the chassis frame, there are provided a rigid housing 74 and rigid structure 71 disposed therein surrounded by a resilient bushing 83, and that the rigid structure 71 is provided with means 72, 73, by which it is cooperable with the bushing 83 yieldingly to resist pivoting of arm 56 about a horizontal axis. Still further, in the herein embodiment of the invention, the rigid structure 71 is integrally attached with a bracket component 67 fixed to the chassis frame, the rigid housing 74 is fixedly attached with the arm 56, and the horizontal axis about which arm 56 is pivotal is provided by a horizontally disposed cylinder 71 extending transverse to the longitudinal axis of the vehicle chassis frame.

Moreover, the pedestal assembly 39 provides a novel and convenient arrangement whereby the jointed connection between the arm 56 and housing 43 is vertically aligned with the axle, and the spring assembly 23 is mountable directly above the axle 24, to provide thereby a compactly arranged structure requiring no extraneous tie beams and the like. The entire torque absorbing components of the herein disclosed suspension, in addition, are arranged for facile attachment to and removal from the frame and axle structure due to the arrangement of the jointed connections at both ends of the rigid arms 56. Advantageously, the arrangement of the present suspension further is not limited to any particular spacing between axles, or the number thereof, and the versatility of the suspension is readily demonstrated by its adaptability to new or existing chassis frames.

It has been found that a slight tilting of the air spring ends from a horizontal plane imparts even greater durability to the air springs 30. Consequently, as best seen in FIGURE 2, the air spring assembly 23 may be so arranged that the spring ends are canted slightly from the horizontal, and preferably around eight degrees therefrom.

It will be understood, as indicated above that changes in construction and arrangement of parts may be resorted to without departing from the field and the spirit of the invention; that in this application only one form of the invention has been disclosed; and that the scope of the invention is defined in the appended claims.

What is claimed is:

1. A suspension for vehicles having an axle and chassis frame adapted to be supported thereby, the suspension at each side of said frame comprising an air spring interposed between the axle and chassis frame to bear vertical loads therebetween; and torque resisting components including an arm extending forwardly from the axle in the direction of normal vehicle travel, a first resilient coupling connecting said arm at the rearward end thereof with said axle and provided with means thereat resistively permitting side or lateral twisting movement of said axle relative to said frame and about an axis extending generally parallel with said arm, said first resilient coupling including a rigid housing disposed in vertical alignment between said axle end and air spring, a rigid connection between said axle end and housing, said rigid housing arranged for receiving therein the rearward end of the arm in spaced relation with the housing inner wall, a resilient bushing interposed between said inner wall and the peripheral surface of said arm rearward end; means on said rearward end arranged to meet resistance from said bushing during universal relative twisting of said axle relative to said chassis frame; and a second resilient coupling connecting the forward end of said arm with a component rigid with said frame, and means associated with the forward end of said arm for resistively permitting pivoting of said arm and said axle about a horizontal axis transverse to the longitudinal axis of said chassis frame, said resilient couplings at the forward and rearward ends of said arm serving to damp and roll and harmonic oscillations between said axle and chassis.

2. The suspension defined in claim 1 wherein the means providing a rigid connection between the axle and the housing comprises an axle seat and means for adjustably positioning said axle seat transversely to the axis of said axle.

3. A suspension for vehicles having an axle and chassis frame for support by one or more axles, the suspension at each side of said frame comprising a yieldable spring-like element interposed between said axle and chassis frame to bear loads thereon with minimum roll and harmonic oscillations responsive to the wheeled moving support and traverse of said axle and chassis frame; torque resisting components including an arm extending forwardly from the axle in the direction of normal vehicle travel, a first resilient coupling connecting said arm at the rearward end thereof with said axle, said resilient coupling including a rigid housing disposed in vertical alignment between said axle and said yieldable spring-like element, said rigid housing receiving therein the rearward end of the arm in spaced relation with said housing, a resilient bushing interposed between said housing and the rearward end of said arm, complemented interengaging means between said resilient bushing and said arm rearward end to resist relative universal twisting forces between said axle end and said chassis frame; and a second resilient coupling connecting the forward end of said arm with said chassis frame, a resilient bushing interposed between said forward end coupling and said arm, complemental interengaging means between said coupling and forward arm end for resistively permitting the pivoting of said arm and said axle about a horizontal axis transverse to the longitudinal axis of said chassis frame, whereby both ends of said arm are rubber mounted through said resilient couplings for damping the roll and harmonic oscillations during the relative universal twisting of said axle relative to said chassis frame.

4. A suspension system for vehicles defined in claim 3 wherein the resilient coupling interengaging means comprise geometric mechanical formations in the respective rubber and metal engaging elements to establish non-slip interengagement therebetween.

5. A suspension system for vehicles defined in claim 4 wherein the geometric mechanical formations effect interengagement without pre-stressing the rubber elements so that maximum damping is effected with minimum reactive coupling.

6. A suspension system for vehicles defined in claim 3 wherein the resilient coupling interengaging means comprise geometric radially extending formations in the rubber and metal engaging elements to preclude slippage therebetween.

References Cited in the file of this patent

UNITED STATES PATENTS

| | | |
|---|---|---|
| 1,668,295 | Weinhardt | May 1, 1928 |
| 1,727,737 | Thorp | Sept. 10, 1929 |
| 1,784,268 | Buckendale | Dec. 9, 1930 |
| 2,367,817 | Brown | Jan. 23, 1945 |
| 2,713,498 | Brown | July 19, 1955 |
| 2,754,132 | Martin | July 10, 1956 |
| 2,814,480 | Clark | Nov. 26, 1957 |